US010795717B2

(12) United States Patent
Paul et al.

(10) Patent No.: US 10,795,717 B2
(45) Date of Patent: Oct. 6, 2020

(54) HYPERVISOR FLOW STEERING FOR ADDRESS SHARING

(71) Applicant: Microsoft Technology Licensing, LLC, Redmond, WA (US)

(72) Inventors: Anirban Paul, Redmond, WA (US); Poornananda Gaddehosur Ramachandra, Redmond, WA (US); Gerardo Diaz-Cuellar, Kirkland, WA (US); Osman Nuri Ertugay, Bellevue, WA (US); Keith Edgar Horton, North Bend, WA (US); Omar Cardona, Bellevue, WA (US); Nicholas David Wood, Woodinville, WA (US); Shankar Seal, Bothell, WA (US); Dinesh Kumar Govindasamy, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 129 days.

(21) Appl. No.: 16/134,912

(22) Filed: Sep. 18, 2018

(65) Prior Publication Data

US 2020/0089517 A1   Mar. 19, 2020

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/455* (2013.01); *G06F 9/45533* (2013.01);
(Continued)

(58) Field of Classification Search
CPC ... G06F 9/455; G06F 9/48; G06F 9/50; G06F 9/45533; G06F 9/45558; G06F 2009/45579; G06F 2009/45583; G06F 2009/45595
See application file for complete search history.

(56) References Cited

U.S. PATENT DOCUMENTS

2006/0090097 A1* 4/2006 Ngan ................. G06F 11/1438
714/6.12
2010/0070677 A1* 3/2010 Thakkar ................. G06F 13/28
711/6
(Continued)

OTHER PUBLICATIONS

"International Search Report and Written Opinion Issued in PCT Application No. PCT/US2019/038865", dated Nov. 26, 2019, 12 Pages.

*Primary Examiner* — Charles M Swift

(57) ABSTRACT

Embodiments relate to hypervisors that provide hardware isolated virtualization environments (HIVEs) such as containers and virtual machines (VMs). A first HIVE includes a first virtual network interface card (NIC) and a second HIVE includes a second virtual NIC. Both virtual NICs are backed by the same physical NIC. The physical NIC has an Internet Protocol (IP) address. The virtual NICs are assigned the same IP address as the physical NIC. A networking stack of the hypervisor receives inbound packets addressed to the IP address. The networking stack steers the inbound packets to the virtual NICs according to tuples of the inbound packets. Packets emitted by the virtual NICs comprise the IP address, pass through the network stack, and are transmitted by the physical NIC with headers comprising the IP address.

20 Claims, 6 Drawing Sheets

(51) Int. Cl.
 *G06F 9/50* (2006.01)
 *H04L 29/12* (2006.01)
(52) U.S. Cl.
 CPC .................. *G06F 9/48* (2013.01); *G06F 9/50* (2013.01); *H04L 61/2007* (2013.01); *G06F 2009/45579* (2013.01); *G06F 2009/45583* (2013.01); *G06F 2009/45595* (2013.01)

(56) References Cited

U.S. PATENT DOCUMENTS

| | | | |
|---|---|---|---|
| 2010/0284404 A1* | 11/2010 | Gopinath | G06F 9/5005 370/392 |
| 2011/0179414 A1* | 7/2011 | Goggin | G06F 3/061 718/1 |
| 2011/0280244 A1 | 11/2011 | Gopinath et al. | |
| 2013/0034109 A1* | 2/2013 | Cardona | H04L 12/4633 370/419 |
| 2013/0254321 A1* | 9/2013 | Johnsen | G06F 9/45533 709/212 |
| 2013/0322335 A1* | 12/2013 | Smith | G06Q 30/01 370/328 |
| 2014/0056141 A1* | 2/2014 | Breternitz, Jr. | H04L 49/10 370/235 |
| 2014/0331221 A1* | 11/2014 | Dong | H04L 45/00 718/1 |
| 2015/0149996 A1* | 5/2015 | Tsirkin | G06F 9/45558 718/1 |
| 2015/0358433 A1 | 12/2015 | Parthasarathy et al. | |
| 2016/0259661 A1* | 9/2016 | Tasoulas | G06F 9/50 |
| 2018/0254981 A1* | 9/2018 | Babu | H04L 12/4641 |
| 2019/0273683 A1* | 9/2019 | Jiang | H04L 12/4641 |

* cited by examiner

HYPERVISOR FLOW STEERING FOR ADDRESS SHARING

BACKGROUND

Hardware-isolated virtualization environments (HIVEs) have seen increasing use for reasons such as security, administrative convenience, portability, maximizing utilization of hardware assets, among others. HIVEs are provided by virtualization environments or virtualization layers such as type-1 and type-2 hypervisors, kernel-based virtualization modules, etc. Examples of HIVEs include virtual machines (VMs) and containers. However, the distinction between types of HIVEs have blurred and there are many architectures for providing isolated access to virtualized hardware. For convenience, the term "hypervisor" will be used herein to refer to any architecture or virtualization model that virtualizes hardware access for HIVEs such as VMs and containers. The term is considered to include privileged host-side virtualization functionality commonly found in privileged partitions or HIVEs. Virtual machine managers (VMMs), container engines, and kernel-based virtualization modules, are some examples of hypervisors.

Most hypervisors provide their HIVEs with virtualized access to the networking resources of the host on which they execute. Guest software executing in a HIVE is presented with a virtual network interface card (vNIC). The vNIC is backed by a physical NIC (pNIC). The virtualization models implemented by prior hypervisors have used a bifurcated network stack state where there is one network stack and state in the HIVE, and a separate network stack and state on the host. The prior design approaches have also involved virtualization of network access for the HIVE. Each HIVE has its own view of the network, its own vNIC with its own Internet Protocol (IP) address and media type, its own media access control (MAC) address, and so forth. The hypervisor has intermediated between the HIVE and the physical network that ultimately carries the HIVE's traffic. All prior hypervisor networking implementations have provided a HIVE with its own IP address and have hidden the host's pNIC and the physical network from the HIVE, which only sees a virtual network managed by the hypervisor, for instance using a virtual switch. Network address translation (NAT) and/or encapsulation has been used to enable a HIVE to communicate when, as is usually the case, the HIVE has an IP address outside the address space of the physical network.

Although the network virtualization approach has advantages such as independence, control, and HIVE mobility, there are also shortcomings. Because the HIVE has a private MAC, it cannot participate in the physical network at the data/link layer. Similarly, because the HIVE has a virtualized IP address, it cannot be a first-order participant in the physical network; all of its packets must be intercepted, translated, etc., by the hypervisor. Application protocols that query and send local IP addresses to peers are known not to work across NAT. Implementing a NAT ALG (application level gateway) for each such application protocol is impractical. As observed only by the inventors, accommodating such guest applications without a NAT ALG requires the same IP address to be used by both the host stack and HIVE stacks, which has not previously been considered. Applications that use multicast and/or broadcast traffic to communicate with other devices on the same subnet are also broken by NAT since the NAT approach places a HIVE's network stack in a private back-end subnet. Finally, loopback communication between guest applications in the same HIVE, or to/from a HIVE from/to another HIVE or the host does not work over the NAT architecture (since each HIVE's network stack behaves fully independently).

Techniques related to direct addressing for HIVEs are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to hypervisors that provide hardware isolated virtualization environments (HIVEs) such as containers and virtual machines (VMs). A first HIVE includes a first virtual network interface card (NIC) and a second HIVE includes a second virtual NIC. Both virtual NICs are backed by the same physical NIC. The physical NIC has an Internet Protocol (IP) address. The virtual NICs are assigned the same IP address as the physical NIC. A networking stack of the hypervisor receives inbound packets addressed to the IP address. The networking stack steers the inbound packets to the virtual NICs according to tuples of the inbound packets. Packets emitted by the virtual NICs comprise the IP address, pass through the network stack, and are transmitted by the physical NIC with headers comprising the IP address.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
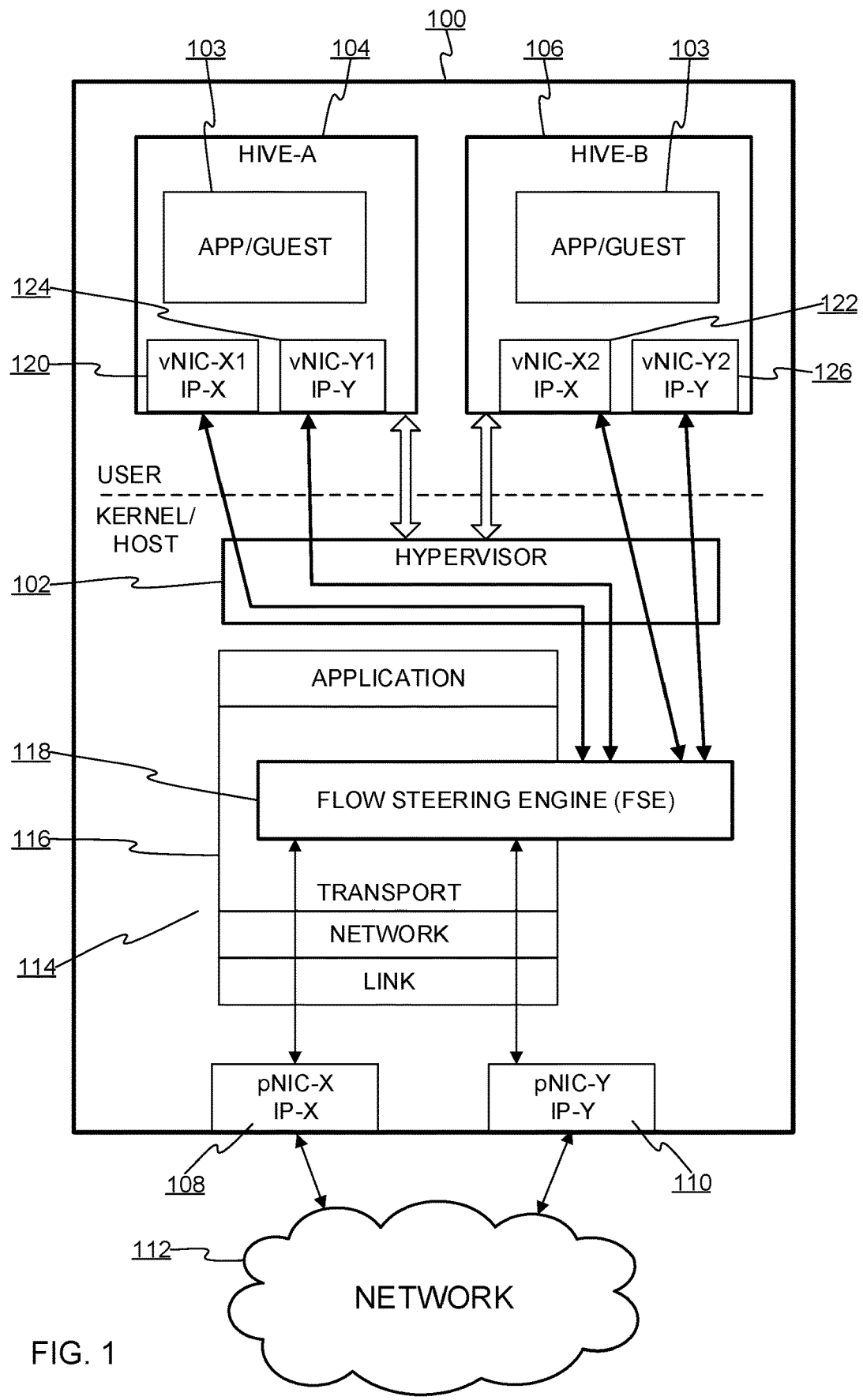
FIG. 1 shows a host computer configured with a hypervisor that provides one or more HIVEs.

FIG. 1 shows a host 100 computer configured with a hypervisor 102 that provides one or more HIVEs such as HIVE-A 104 and HIVE-B 106. The hypervisor 102 typically provides the HIVEs with virtualized access to memory, storage, networking hardware, and processors/cores of the host 100. Aside from network virtualization, the virtualization functionality of the hypervisor 102 is known and details thereof may be found elsewhere. With some exceptions, the guest software 103 running in a HIVE is generally unaware that it is executing in a virtualized partition rather than directly on a host. The guest software 103 may be, for example, an application executing in a container type of HIVE, a guest operating system executing in a VM type of HIVE, or an application being executed by a guest operating system.

The host 100 also includes one or more pNICs such as pNIC-X 108 and pNIC-Y 110. The pNICs provide media access to a physical network 112. A host network stack 114 handles network communications passing between the host 100 and the physical network 112 via the pNICs. The host network stack 114 includes typical layers, such as a network layer, transport layer 116, TCP/UDP modules, etc. The network or transport layer 116 includes or communicates with a flow steering engine 118. By default, most packets passing through the transport layer 116 will be evaluated by the flow steering engine 118. Alternatively, circuit switching (where there is a predetermined path) may be used, in which case packet evaluation may not be required. The flow steering engine 118 may be implemented as part of a TCP or UDP module, or as a shim or filter between transport layer 116 and another layer of the host network stack 116.

As will be described in detail below, the flow steering engine 118 enables the vNICs of the HIVEs to mirror the MAC and IP addresses of the pNICs. In the example shown in FIG. 1, pNIC-X has network address IP-X (and MAC-X, not shown), and pNIC-Y has network address IP-Y (and MAC-Y, also not shown). HIVE-A and HIVE-B have, respectively, vNIC-X1 120 and vNIC-X2 122. As will be described below, the communications of vNIC-X1 and vNIC-X2 pass through pNIC-X. Similarly, HIVE-A and HIVE-B have, respectively, vNIC-Y1 124 and vNIC-Y2 126. As will be described below, the communications of vNIC-Y1 and vNIC-Y2 pass through pNIC-Y. In other embodiments, the pNIC does not need to see the traffic; instead, the flow steering engine resends back to the corresponding vNIC (e.g. from vNIC-Y1 to vNIC-Y2), thus making a shorter path length. Although embodiments described herein work with multiple pNICs and vNICs (as illustrated by the examples), they may also work with a single pNIC and a single vNIC in each HIVE. Furthermore, the embodiments will work when multiple IP addresses are assigned to a same pNIC.

Notably, the vNICs are assigned the IP and/or MAC addresses of the pNICs that back the vNICs. For example, pNIC-X has IP address IP-X, and consequently IP-X is also assigned to vNIC-X1 and vNIC-X2. Similarly, pNIC-Y has IP address IP-Y, which is assigned to vNIC-Y1 and vNIC-Y2. Addresses IP-X and IP-Y are the addresses exposed within the respective HIVEs. As will be discussed next, the flow steering module 118 uses two or more fields of the 5-tuples (i.e., source IP and port, destination IP and port, and protocol) of inbound packets passing up the network stack 114 to decide whether to divert inbound packets to HIVEs, and if so, which HIVEs will receive which inbound packets (as used herein, "tuple" refers to any two or more of the fields found in a 5-tuple, e.g., local address and port). Inbound packets that are not diverted to a HIVE continue up the host network stack 114 for host-side consumption above the transport layer. Outbound packets that originate from the host flow down the host network stack 114 and out the pNICs in normal fashion. Outbound packets that originate from the HIVEs enter at the transport layer 116 via the flow steering engine 118 and pass down the host network stack 114 and out through the appropriate pNIC without requiring NAT and/or transport-level encapsulation, i.e., the tuples in their headers flow through and out the host without modification. Packets transmitted by a physical NIC may be addressed "from" the same IP address, regardless of whether they originated on the host-side or in a HIVE. In embodiments where packets flow in a circuit-switched fashion where flow or route lookups are unnecessary, packets are just sent by the pNIC associated with the relevant vNICs. In this case, the decision has been made before a given packet is handled, so circuit-switched embodiments involve a shorter path for packets to traverse.

Figure 2:
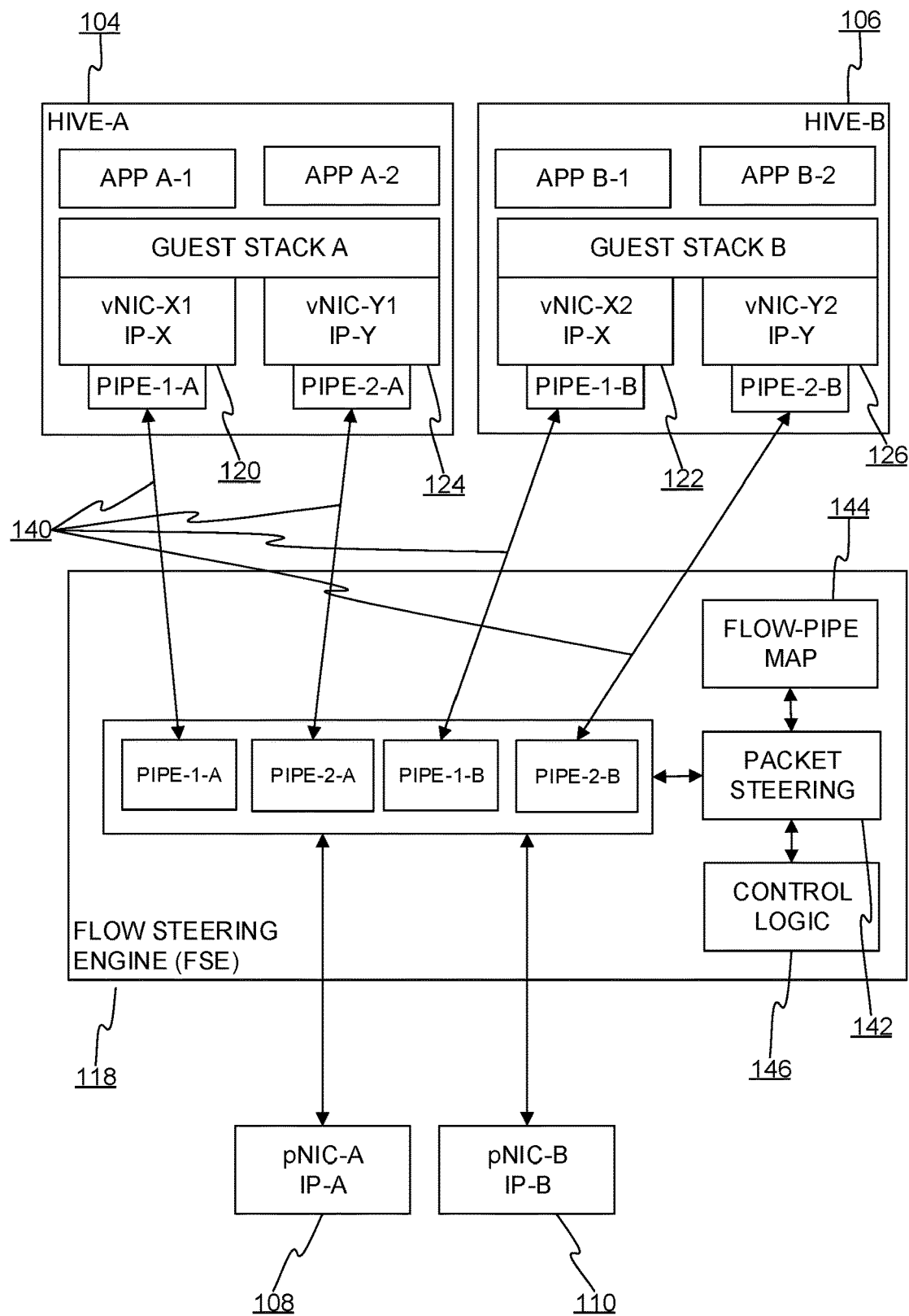
FIG. 2 shows details of a flow steering engine.

FIG. 2 shows details of the flow steering engine 118. The flow steering engine 118 functions as a point for HIVEs to inject packets into the network or transport layer 116 of the host network stack 114. The flow steering engine 118 also functions as a demultiplexor of inbound packets by deciding which inbound packets continue up the host network stack 114, and which inbound packets will be diverted to which vNICs. In circuit-switched embodiments with a reduced memory footprint and shorter path, a flow lookup is not required, rather a tuple lookup (e.g., a 2-tuple lookup of the local address and local port in the address-port-to-pipe table) is sufficient. Returning to FIG. 2, the flow steering engine 118 uses pipes 140 to exchange packets between the host network stack 114 and the vNICs of the HIVEs. The pipes can be implemented in a variety of ways. For example, pipes may be implemented as memory pages shared between the hypervisor and the respective HIVEs (or other forms of inter-process communication), virtual bus connections, socket-like connections, private virtual switch connections, and so forth. How the pipes are implemented is not significant. A setting or policy can be provided for each to indicate whether a pipe is allowed to be connected to a HIVE.

The flow steering engine 118 also includes packet steering logic 142 which performs the primary function of the flow steering engine 118, namely, deciding whether an inbound transport packet should be diverted to a vNIC of a HIVE, and if so, to which one. The packet steering logic 142 maintains and uses a flow-pipe map 144 which maps pipe handles of the pipes 140 to flows as identified by the tuples of the inbound packets. In some embodiments the map may be a tuple-pipe map and mapping flows to pipes per se is not necessary. In effect, the flow-pipe map connects vNICs with network flows that have endpoints in HIVEs and endpoints on or beyond the physical network 112.

The flow steering engine 118 may also be equipped with control logic 146. Whereas the packet steering logic 142 makes sure that the right packets go to the right place, the control logic 146 influences how those decisions are made. The control logic 146 may provide steering rules to the packet steering logic 142, for instance, on how to partition ports, how to maintain the flow-pipe map 144, and so forth. The control logic may also consult with network security policies to implement same.

Control logic influencing policy can be built into the flow steering logic itself or it can be provided by an external entity such as a local or remote service. For example, this will influence decisions such as whether to implement multicast only for IPv6 or only for mDNS (multicast DNS). Control logic can also be used to dictate behavior of the flow steering engine for cases where one of the pipes may be considered as special and originating traffic that is capable of influencing network state. For example, such a special pipe could be from a special HIVE (e.g., trusted, secure, administrator-controlled) as compared to other HIVEs. A concrete example would be UPNP (Universal Plug and Play) packets that originate from such a HIVE that configure the IGD (Internet Gateway Device) connected to the host. Such packets should not be allowed to modify IGD state if they come from other HIVEs.

Figure 3:
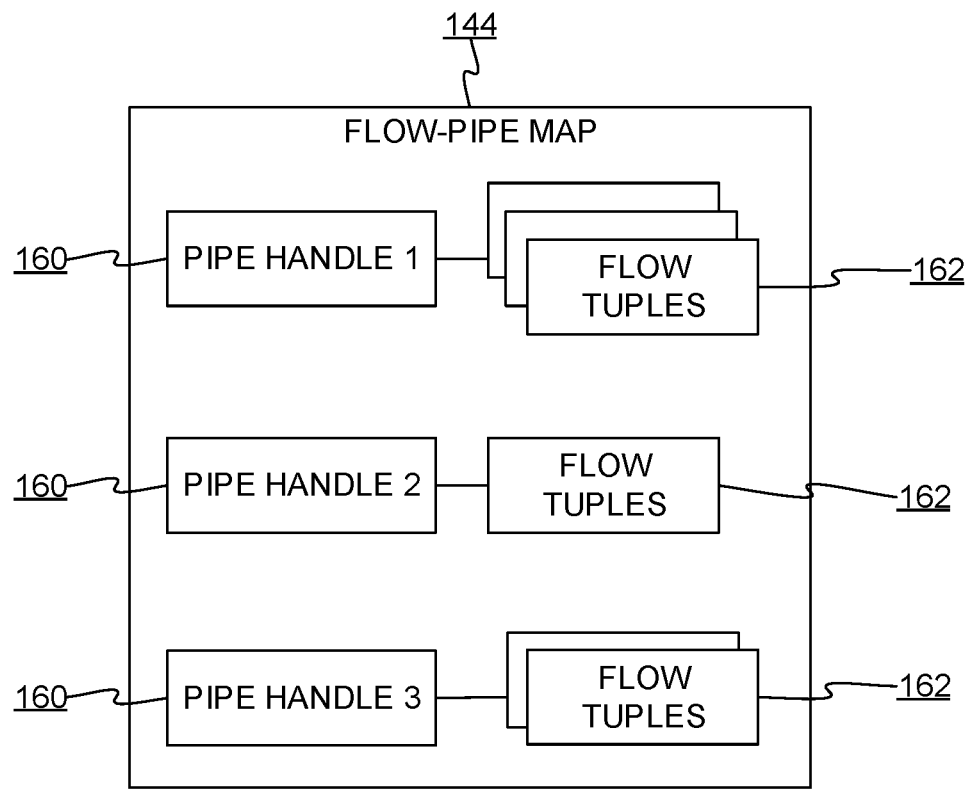
FIG. 3 shows an example of a flow-pipe map.

FIG. 3 shows an example of the flow-pipe map 144. The flow-pipe map 144 includes a list of pipe handles 160. Each pipe handle 160 has a set of associated flow identifiers, e.g., flow tuples 162 (or components thereof). When an inbound packet is received by the flow steering engine 118, the flow steering engine compares the tuple of the inbound packet with the flow tuples 162 in the flow-pipe map 144 to find the pipe handle 160 for that flow. Maintenance of the flow-pipe map 144 is discussed further below.

Figure 4:
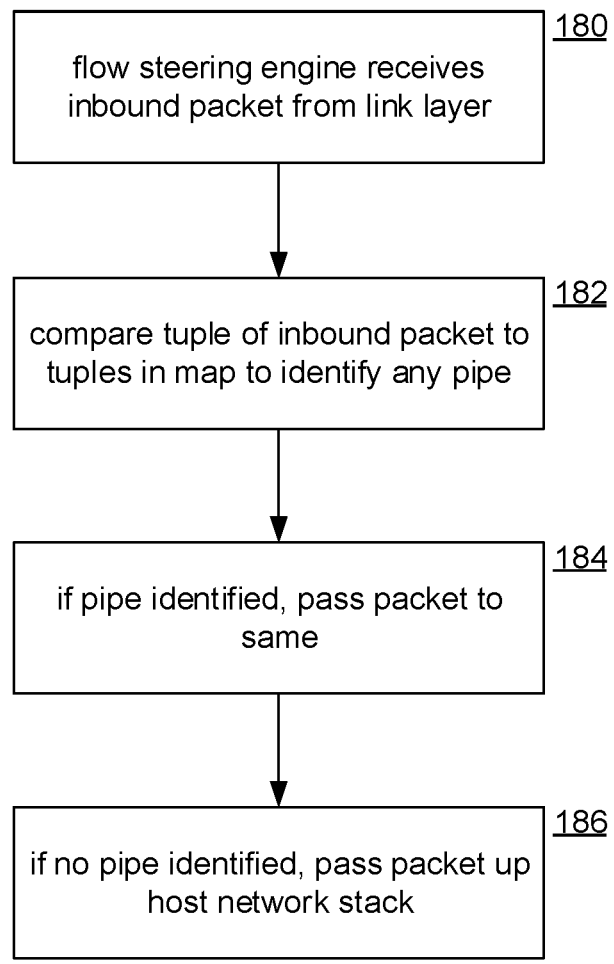
FIG. 4 shows a process performed by the flow steering engine when an inbound packet is received.

FIG. 4 shows a process performed by the flow steering engine when an inbound packet is received. At step 180, the flow steering engine receives an inbound packet from the link layer. The packet is reassembled from the payloads of one or more inbound frames received by one of the host's pNICs (alternatively, the packet is reassembled by the TCP/IP stack at the network/transport layers before being handed over to flow steering engine). At step 182 the type of the inbound packet is compared to tuples in the flow-pipe map 144 to identify a pipe handle for the packet. At step 184, if a pipe was found for the inbound packet, the packet is steered to the corresponding pipe handle. The packet passes through the pipe to the vNIC at the other end of the pipe. The vNIC in turn passes the packet up the corresponding HIVE's network stack (which may be running as guest software or which may be a part of the HIVE that is managed by the hypervisor, as in the case of containers). The tuple in the transport header of the packet, when received by the HIVE, is the same as the tuple in the transport header of the packet when it was received by the host pNIC. At step 186, if no pipe was identified for the inbound packet, then the inbound packet continues up the host network stack for ordinary host-side consumption; on the host side, the flow steering engine's intervention is transparent above the transport layer or whichever layer the flow-steering embodiment plugs into the network stack.

In another embodiment, upon inspecting an inbound packet, if there is no guest HIVE that is found, the engine may indicate the packet to the host operating system, which takes subsequent action such as invoking one or more transformations on the packet, for instance decapsulation, decryption, etc. The transformed packet can be further inspected to determine if it needs to be given to the guest HIVEs or which HIVE or vNIC should receive the packet. Other examples of this packet transformation are NAT'ing, Generic Routing Encapsulation (GRE), IPSec encapsulation/encryption, etc. Symmetrically, an outbound packet from the guest HIVE may go through one or more transformations by the host operating system stack after the flow steering engine inspects it but before the packet is transmitted on the wire.

Figure 5:
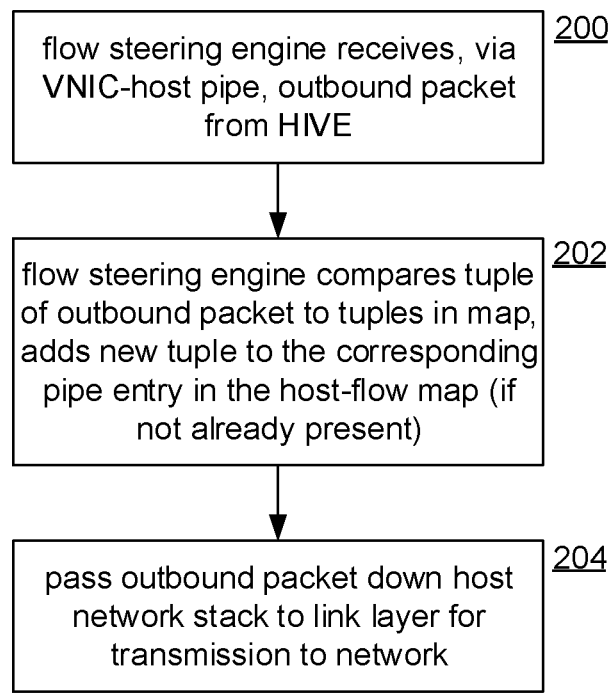
FIG. 5 shows a process performed by the flow steering engine for outbound packets.

FIG. 5 shows a process performed by the flow steering engine for outbound packets. Initially, guest software in a HIVE initiates communication in the usual manner by opening a network connection and passing data through the open connection. When such a new flow is initiated by the guest software, a first packet will pass out of a vNIC of the HIVE, through a pipe from the vNIC to the flow steering engine, and then at step 200 the packet is received by the flow steering engine.

At step 202 the flow steering engine checks the tuple of the outbound packet to see if there is an entry in the flow-pipe map for the pipe corresponding to the vNIC in use. If there is no entry, as is the case when a new connection is initiated by the guest software, then the pipe's entry in the flow-pipe map is updated to include the tuple of the outbound packet. If circuit switching is used (i.e., the path is already determined and a lookup of no kind is needed), the HIVE has already determined which vNIC to send the packet on, and therefore which pNIC to use is already known, which is efficient. This may be predetermined when the vNIC(s) are bound to the pNIC. Specifically, a call may be provided such that when the vNIC is created it associates with a pipe that is assigned to a pNIC. This technique may be dynamic in that a route lookup is performed to figure out the assignment or perhaps because the HIVE might not be trusted to send legitimate packets. In some embodiments the remote address is checked to see if it is a local address, and if so the packet is treated as an inbound packet (otherwise it follows its circuit).

At step 204 the flow steering engine injects the outbound packet where it passes down the network stack which emits the packet from the appropriate pNIC. The packet emitted by the host has the same transport tuple that the packet had when it passed out of the HIVE.

In one embodiment, the flow steering engine also has pipes to the pNICs to facilitate matching vNIC transmissions with the pNICs that back the vNICs. In another embodiment, the flow steering engine is assumed to have access to the services of a network stack such as a TCP/UDP/IP stack. Since the network state with regards to IP addresses and routes is shared between the host operating system and the HIVEs, upon receiving an outbound packet, there is enough information for the engine to have the network stack (or the engine itself using the services/APIs provided by the network stack) perform ARP resolutions, route lookups, etc., which then point to the pNIC and the required framing information that can be used to emit the packet from the pNIC. In this regard, the flow steering engine has two roles—one role where access to a network stack is available (as with any application) through the network stack APIs on the host operating system, and another role where, unlike ordinary applications, the engine serves as an intermediary passing packets to the various HIVEs through the hypervisor. Another approach is to have a HIVE send a fully constructed frame and the engine on the host figures out how to rewrite or correct the layer-2 header information based on some policy or the information the engine has on the host to transmit the packet.

With the flow steering approach, guest software has a similar "view" of the network as applications running on the hypervisor side of the host or in a root partition. However, because HIVEs and the host share the same IP addresses (and possibly routes, media characteristics, properties, link speed, etc.), it is possible that a tuple of an inbound transport packet is not unique to one HIVE. That is, if two HIVEs are communicating with a same remote IP address and a same remote port number, the local port number may be key to uniquely identifying which flows belong to which HIVEs. A number of techniques can be used to address the possibility that two HIVEs could each have respective flows with the same transport tuple. One technique is to partition the port pool on the host among the HIVEs; each HIVE has a set of reserved ports. Another technique is to configure the flow steering engine to block out use of a port for the first HIVE to use that port. Yet another approach is to provide a hypervisor enlightenment (or hypercalls) that allows guest software to check for port availability and reserve ports, for instance in the form of an application programming interface (API) exposed by the hypervisor.

The architecture described above can allow multicast and broadcast traffic to be replicated to all pipes. This can also be done for applications that re-use sockets and hence are supposed to listen on the same UDP port and all get the same data. Another benefit is that security policy for all HIVEs can be implemented at the flow steering engine, which is unavoidable and transparent to the guest software.

For some applications that require sharing a same port number among different flows/endpoints, it is possible to use packet inspection to differentiate endpoints. For example, if two HIVEs are both using port 80 for an HTTP service, URLs in HTTP messages can be analyzed to determine which HIVE a packet should be delivered to. This technique is not necessary if any remote parameters of the respective tuples/flows differ (e.g., different "from" addresses or "from" port numbers). That is, port conflict is only an issue when the tuples of two different HIVEs are identical. For outbound packets a different remote address will be sufficient to differentiate tuples. For applications that use a framework that uses the same local port, the tuple is potentially not enough to identify the endpoint and packet inspection may be helpful for differentiation.

Figure 6:
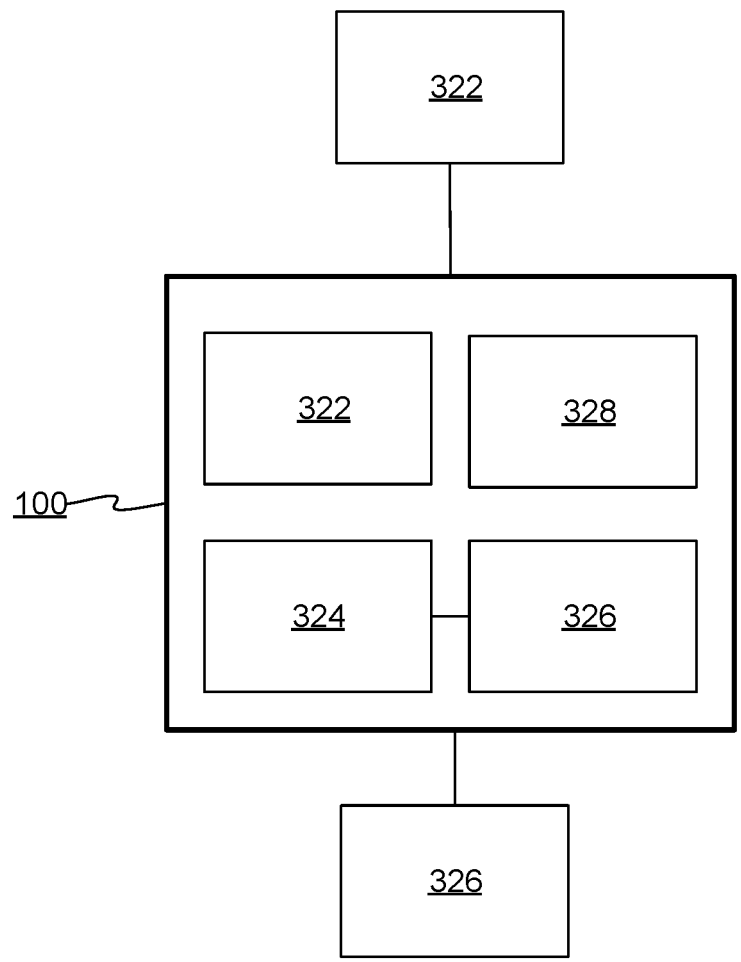
FIG. 6 shows details of a computing device or host computer on which embodiments described herein may be implemented.

FIG. 6 shows details of the computing device or host 100 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device or host 100 (possibly via cloud APIs) to implement the embodiments described herein.

The computing device or host 100 may have one or more displays 322, a camera (not shown), a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device or host 100 may cooperate in ways well understood in the art of machine computing. In addition, input devices may be integrated with or in communication with the computing device or host 100. The computing device or host 100 may have any form-factor or may be used in any type of encompassing device. The computing device or host 100 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computing device comprising:
   processing hardware;
   a physical network interface card (NIC) configured to transmit and receive frames on a physical network, the physical NIC further configured to receive inbound packets routed by the physical network to the physical NIC based on the inbound packets being addressed to an Internet Protocol (IP) address assigned to the physical NIC;
   storage hardware storing a hypervisor configured to be executed by the processing hardware to provide hardware isolated virtual environments (HIVEs), the hypervisor further configured to provide each HIVE with virtualized access to the processing hardware, the storage hardware, and the physical NIC;
   each HIVE comprising a respective virtual NIC, wherein each virtual NIC virtualizes access to the physical NIC, wherein each virtual NIC comprises a software construct implemented by the processing hardware and the storage hardware, and wherein each HIVE is configured to host respective guest software;
   the hypervisor further configured to assign to each virtual NIC the IP address that is assigned to the physical NIC;

the hypervisor further configured to determine, according to the inbound packets, which inbound packets to direct to which virtual NICs and which inbound packets to pass to the hypervisor, wherein the inbound packets directed to the HIVEs are received by the guest software while such inbound packets continue to be addressed to the IP address, and wherein first guest software in a first HIVE receives first inbound packets addressed to the IP address of the physical NIC and second guest software in a second HIVE receives second inbound packets addressed to the IP address of the physical NIC.

2. A computing device according to claim 1, wherein when guest software in a HIVE receives an inbound packet directed to the HIVE by the hypervisor, the inbound packet is addressed to the IP address of the physical NIC and is addressed as having been sent from a node on the physical network, and wherein the node on the physical network communicates with the guest software.

3. A computing device according to claim 1, further comprising a network stack comprising a layer, the layer comprising a flow steering engine that determines, based on tuples of the inbound packets, which inbound packets to direct to which virtual NICs.

4. A computing device according to claim 3, wherein the flow steering module comprises a map that maps flows or tuples to pipes or virtual NICs.

5. A computing device according to claim 4, wherein the map comprises identifiers of the pipes in association with tuples of flows, and wherein the flow steering module compares a tuple of an inbound packet to a tuple in the map to determine which pipe to use to deliver the inbound packet to a corresponding virtual NIC.

6. A computing device according to claim 4, wherein the pipes comprise respective private communication channels between the flow steering engine and the virtual NICs.

7. A computing device according to claim 1, wherein the virtual NICs and the physical NIC share a same media access control (MAC) address.

8. A method performed by a computing device comprising processing hardware and storage hardware storing instructions configured to cause the processing hardware to perform the method, the method comprising:
  executing a hypervisor, the hypervisor providing a first HIVE comprised of a first virtual NIC backed by a physical NIC that is connected to a physical network, the hypervisor providing a second HIVE comprised of a second virtual NIC backed by the physical NIC, wherein the physical NIC, the first virtual NIC, and the second virtual NIC share a same Internet Protocol (IP) address, wherein each virtual NIC comprises a software construct implemented by the processing hardware and the storage hardware, and wherein each virtual NIC is backed by the physical NIC;
  receiving, from a physical network, at the physical NIC, packets of network flows, wherein the packets when received at the physical NIC are all addressed to the IP address, wherein the network flows terminate in the HIVEs;
  passing the inbound packets up a network stack of the hypervisor and, at or in communication with a layer of the network stack, analyzing tuples of the respective inbound packets and based thereon:
    when a tuple is determined to be associated with a virtual NIC, rather than allowing the corresponding packet to continue up the network stack past the layer, directing the corresponding inbound packet to the virtual NIC, wherein the virtual NIC receives the corresponding inbound packet with the same tuple that caused the inbound packet to be directed to the virtual NIC, wherein when first guest software in the first HIVE receives first of the inbound packets the first of the inbound packets are addressed as having been sent to the IP address of the physical NIC, and wherein when second guest software in the second HIVE receives second of the inbound packets the second of the inbound packets are addressed as having been sent to the IP address of the physical NIC; and
    when a tuple is determined to not be associated with a virtual NIC, rather than directing the corresponding inbound packet to a virtual NIC, allowing the corresponding inbound packet to continue up the network stack past the layer.

9. A method according to claim 8, wherein the network stack comprises a module that analyzes the tuples, and wherein the module maintains information indicating which tuples are associated with which virtual NIC.

10. A method according to claim 8, further comprising:
  receiving, by the network stack, from a virtual NIC, an outbound packet, the outbound packet comprising a tuple; and
  analyzing the tuple of the outbound packet and based thereon forming and storing an association between the tuple of the outbound packet and the virtual NIC from which it was received.

11. A method according to claim 10, further comprising:
  receiving an inbound packet comprising the tuple of the outbound packet; and
  directing the inbound packet to the virtual NIC based on one or more fields of the tuple of the inbound packet and of the tuple of the stored association.

12. A method according to claim 8, wherein the hypervisor comprises an application programming interface (API) configured to be invoked by guest software executing in a HIVE, the API further configured to be invoked by the guest software to control an association between a network flow and a virtual NIC or to reserve a port.

13. A method according to claim 12, wherein a networking component running in a HIVE is configured to be virtualization-aware and determines that it is executing in a virtualized environment, and, based on determining that it is executing in a virtualized environment: communicates with the hypervisor to configure a flow steering engine that performs the analyzing.

14. A method according to claim 8, the process further comprising partitioning a pool of transport-layer ports among the HIVEs or virtual NICs such that a port in the pool is only available for use by one HIVE or virtual NIC.

15. A method according to claim 8, wherein the computing device comprises a second physical NIC with a second IP address, wherein the HIVEs comprise respective second virtual NICs with the second IP address that are backed by the second physical NIC, and wherein the hypervisor steers packets to the virtual NICs and second virtual NICs according to which physical NIC received the packets.

16. Storage hardware storing information configured to cause a computing device comprising processing hardware to perform a process, the process comprising:
  executing a hypervisor that manages HIVEs executing on the computing device, each HIVE comprised of respective guest software, the computing device comprised of a first physical NIC having a first Internet Protocol (IP) address and comprised of a second physical NIC having a second IP address;

providing first virtual NICs for the HIVEs, respectively, wherein each virtual NIC comprises a software construct implemented by the processing hardware and the storage hardware, wherein the first virtual NIC of each HIVE is assigned the first IP address, wherein exposure of each first virtual NIC to its respective HIVE's guest software also exposes the first IP address to its respective HIVE's guest software such that when the respective guest software receives inbound packets the inbound packets are addressed as being sent to the first IP address, and wherein each of the first virtual NICs is backed by the first physical NIC; and providing second virtual NICs for the HIVEs, respectively, wherein the second virtual NIC of each HIVE is assigned the second IP address, wherein exposure of each second virtual NIC to its respective HIVE's guest software also exposes the second IP address to its respective HIVE's guest software such that when the respective guest software receives inbound packets the inbound packets are addressed as being sent to the second IP address, and wherein each of the second virtual NICs is backed by the second first physical NIC.

17. Storage hardware according to claim 16, the process further comprising preventing any two HIVEs from using the same local transport port.

18. Storage hardware according to claim 16, the process further comprising steering packets to virtual NICs according to tuples of the packets.

19. Storage hardware according to claim 18, the process further comprising assigning to a virtual NIC whatever IP address is assigned to a physical NIC that backs the virtual NIC.

20. Storage hardware according to claim 16, the process further comprising using circuit switching to steer outbound packets emitted by the vNICs.

* * * * *